US012630236B2

(12) United States Patent
    Algüera et al.

(10) Patent No.: US 12,630,236 B2
(45) Date of Patent: May 19, 2026

(54) KINGPIN ASSEMBLY

(71) Applicant: Jost-Werke Deutschland GmbH,
               Neu-Isenburg (DE)

(72) Inventors: José Manuel Algüera, Aschaffenburg
               (DE); Steffen Haber, Groß-Gerau (DE);
               Stephan Gitzen, Riedstadt (DE);
               Rudolf Schlotthauer, Neu-Isenburg
               (DE); Alexander Bockius,
               Ginsheim-Gustavsburg (DE); **Paul
               Hansen**, Neu-Isenburg (DE)

(73) Assignee: Jost-Werke Deutschland GmbH,
               Neu-Isenburg (DE)

( * ) Notice: Subject to any disclaimer, the term of this
              patent is extended or adjusted under 35
              U.S.C. 154(b) by 442 days.

(21) Appl. No.: 18/462,629

(22) Filed: Sep. 7, 2023

(65) Prior Publication Data

US 2024/0083525 A1     Mar. 14, 2024

(30) Foreign Application Priority Data

Sep. 9, 2022   (DE) .......................... 102022123057.0

(51) Int. Cl.
    *B62D 53/08*     (2006.01)
    *B62D 29/04*     (2006.01)
(52) U.S. Cl.
    CPC ......... *B62D 53/0842* (2013.01); *B62D 29/04*
                                                    (2013.01)
(58) Field of Classification Search
    CPC . B60D 1/36; B60D 1/363; B60D 1/64; B60D
                 1/62; B62D 53/08; B62D 53/0842;
    (Continued)

(56) References Cited

U.S. PATENT DOCUMENTS

| | | | | |
|---|---|---|---|---|
| 4,455,036 A | * | 6/1984 | Barr ....................... | B62D 53/10 |
| | | | | 280/434 |
| 7,793,966 B2 | * | 9/2010 | Richter ................... | B60D 1/64 |
| | | | | 280/433 |

(Continued)

FOREIGN PATENT DOCUMENTS

| | | | |
|---|---|---|---|
| DE | 1655977 A | 10/1971 | |
| DE | 1655977 A1 * | 10/1971 | ......... B62D 53/0842 |

(Continued)

OTHER PUBLICATIONS

European Search Report dated Jan. 18, 2024 for family member
Application No. EP23192675.

*Primary Examiner* — Valentin Neacsu
*Assistant Examiner* — Tyler Ray Ferguson
(74) *Attorney, Agent, or Firm* — Hudak, Shunk & Farine
Co. LPA

(57)              ABSTRACT

Kingpin assembly for a semitrailer of a road train, including
a king pin defining an axis of rotation (A), a pivot bearing
arranged around the axis of rotation (A), and a holder
connected to the pivot bearing and pivotable around the axis
of rotation (A) for indirectly or directly holding an electrical
and/or electromagnetic and/or pneumatic and/or hydraulic
connecting means wherein the king pin includes a king pin
flange for mounting the king pin indirectly or directly to the
semitrailer, wherein the pivot bearing includes a fixed bear-
ing ring or a fixed bearing ring segment relative to the king
pin and a bearing ring or a bearing ring segment rotatable
relative thereto, wherein the holder is fixed to the rotatable
bearing ring and wherein a support element, which is axially
spaced from the rotatable bearing ring and abuts directly
against the king pin, is connected to the holder and is
adjustable in length in the radial direction (R) with respect
to the axis of rotation (A).

20 Claims, 4 Drawing Sheets

(58) Field of Classification Search
CPC .. B62D 53/0857; B62D 53/12; B62D 53/125;
B62D 29/04; B62D 53/0878; B62D
53/0885; B62D 53/0828; B60R 2300/808
USPC ..... 280/420, 421, 422, 456.1, 433, 434, 437
See application file for complete search history.

(56) References Cited

U.S. PATENT DOCUMENTS

| | | | |
|---|---|---|---|
| 2009/0008903 A1* | 1/2009 | Richter | B62D 53/125 |
| | | | 280/433 |
| 2011/0221165 A1* | 9/2011 | Alguera | B60D 1/363 |
| | | | 280/477 |
| 2020/0001669 A1* | 1/2020 | Metternich | B62D 53/08 |
| 2021/0188375 A1* | 6/2021 | Köster | B62D 53/0842 |
| 2021/0260944 A1* | 8/2021 | Metternich | B62D 53/08 |

FOREIGN PATENT DOCUMENTS

| | | | | |
|---|---|---|---|---|
| DE | 102004024333 A1 | 12/2005 | | |
| DE | 102008001349 B4 * | 2/2011 | | B60D 1/64 |
| DE | 102018106676 B3 * | 7/2019 | | B60D 1/015 |
| EP | 1900620 A1 | 3/2008 | | |
| EP | 1918179 A1 * | 5/2008 | | B62D 53/125 |
| EP | 3891051 B1 | 2/2022 | | |
| GB | 2441752 A * | 3/2008 | | B62D 53/125 |
| JP | H08198132 A * | 8/1996 | | |
| JP | 11-222163 A | 7/1999 | | |
| JP | H11222163 A * | 8/1999 | | |
| WO | WO-2005110836 A1 * | 11/2005 | | B62D 53/125 |
| WO | 2020249458 A1 | 12/2020 | | |

* cited by examiner

KINGPIN ASSEMBLY

FIELD OF THE INVENTION

Kingpin assembly for a semitrailer of a road train, comprising a kingpin defining a pivot axis, a pivot bearing arranged around the pivot axis, and a holder connected to the pivot bearing and pivotable around the pivot axis for indirectly or directly holding in particular an electrical and/or electromagnetic and/or pneumatic and/or hydraulic connecting means, wherein the kingpin comprises a kingpin flange for mounting the kingpin indirectly or directly to the semitrailer, wherein the pivot bearing comprises a bearing ring fixed relative to the kingpin or a bearing ring segment fixed relative to the kingpin and a bearing ring rotatable relative to the kingpin or a bearing ring segment rotatable relative to the kingpin, and wherein the holder is fixed to the rotatable bearing ring or rotatable bearing ring segment.

BACKGROUND OF THE INVENTION

Such a kingpin assembly is known, for example, from documents EP 3 891 051 A1, EP 1 918 179 A1 and DE 10 2004 024 333 A1.

The tractor and the semi-trailer, also referred to simply as the semitrailer, form the road train, which is also referred to as a road train. A fifth wheel plate is arranged on the tractor, with which the king pin located on the underside of the semitrailer is engaged and locked. For coupling the semitrailer, the fifth-wheel coupling plate is usually designed with an entry opening tapering in a wedge shape in the direction of travel, the entry opening having a free installation space with an installation space depth that ensures interference-free entry and exit of the kingpin into the fifth-wheel coupling plate. During coupling, the semitrailer slides with its semitrailer plate, on which the kingpin is indirectly or directly mounted in a fixed position, on the surface of the fifth-wheel coupling plate, thus providing vertical positioning. Lateral guidance is provided by the kingpin, which is positively guided in the entry opening during coupling until it reaches its locking position. The entry opening is determined in the downward direction by the length of the king pin. In other words, components located below the entry opening, such as reinforcing ribs, cannot be engaged by the kingpin when the trailer is coupled or uncoupled.

Terms such as "vertical", "horizontal", "top" and "bottom" refer herein to the direction of gravity, unless explicitly stated otherwise. Terms such as "axial", "radial" and "tangential" refer herein, unless explicitly stated otherwise, to the axis of rotation defined by the kingpin.

The electrical and/or electromagnetic and/or pneumatic and/or hydraulic connecting means is part of a plug-in coupling system for connecting lines between the tractor and the trailer, as also described, for example, in DE 10 2004 024 333 A1. Plug-in coupling systems are known in various designs. The plug-in coupling system contains at least a plug and a plug socket and generally also other components that serve to automatically connect and disconnect the plug and plug socket when coupling and uncoupling the semitrailer and the tractor. The term "connecting means" in this sense therefore includes at least a plug or a plug socket. For safety reasons, the current-carrying end of the plug-in coupling system is usually designed as a plug socket on the tractor, while the corresponding plug is arranged on the semitrailer. In particular, the female plug is arranged in a fixed position on the fifth wheel coupling below the entry opening and is thus located in a protected area in which it cannot collide with the king pin during engagement.

The term "holder" refers both to a mounting base for a supporting frame in the case of a multi-part design, in which case the connecting means is held on the supporting frame and thus indirectly on the holder (=mounting base), and to the supporting frame itself in the case of a single-piece design, in which case the connecting means is held directly or indirectly on the holder (=supporting frame).

The connecting means, i.e. generally the plug, is usually arranged on the underside of the supporting frame or inside the supporting frame in a cavity, the supporting frame, viewed in a horizontal plane, having a wedge-shaped or v-shaped configuration which is configured complementarily to the wedge-shaped entry opening in such a way that the supporting frame always aligns itself in the same horizontal position relative to the fifth wheel coupling when engaged, thereby enabling the plug and plug socket to be securely connected.

Furthermore, as is known, the plug can be arranged on a base plate on the supporting frame, which is spring-mounted in the vertical direction relative to the supporting frame. When coupling the trailer until the plug and socket are finally connected, the spring-loaded base plate or the plug is guided under pressure to an insertion aid in the area of the entry opening, whereby positioning also takes place automatically in the vertical direction and any necessary height compensation is thus ensured.

Accordingly, it is known from DE 10 2004 024 333 A1 that the supporting frame of the plug device is a V-shaped frame structure whose sides are adapted to the angle of the entry opening. Side faces extend downward from both sides of the supporting frame and merge at their kingpin ends into a common supporting web. The supporting web abuts the lower collar of the kingpin and transfers any tilting moments into the kingpin. This defines the vertical position of the supporting frame relative to the kingpin and the trailer plate, ensuring that the process of coupling can be carried out safely in the manner described above by vertical and horizontal guidance.

However, due to wear and especially in the case of retrofitted or replaced kingpin assemblies, variations in the relative arrangement of the fasteners and the kingpin may come to light due to manufacturing tolerances, which jeopardize safe coupling despite the height compensation described above. The object of the present invention is therefore to provide a kingpin assembly which ensures equally safe coupling in the event of wear and in the event of retrofitting or repair in a simple manner.

SUMMARY OF THE INVENTION

The object is solved by a kingpin assembly for a semitrailer of a road train, comprising a kingpin defining an axis of rotation (A), a pivot bearing arranged around the axis of rotation (A), and a holder connected to the pivot bearing and pivotable about the axis of rotation (A) for indirectly or directly holding in particular an electrical and/or electromagnetic and/or pneumatic and/or hydraulic connecting means; wherein the king pin comprises a king pin flange for mounting the king pin indirectly or directly to the semitrailer, wherein the pivot bearing comprises a bearing ring fixed relative to the king pin or a bearing ring segment fixed relative to the king pin and a bearing ring rotatable relative to the king pin or a bearing ring segment rotatable relative to the king pin; wherein the holder is fixed to the rotatable bearing ring or rotatable bearing ring segment; and wherein a support element is connected to the holder, which support element is axially spaced from the rotatable bearing ring or the rotatable bearing ring segment, abuts directly against the king pin and is adjustable in length in the radial direction (R) with respect to the axis of rotation (A).

According to the invention, the kingpin assembly mentioned above is configured further in that a support element is connected to the holder, which support element is axially spaced from the rotatable bearing ring or the rotatable bearing ring segment, abuts directly against the king pin, and is adjustable in length in the radial direction with respect to the axis of rotation.

Together with the fixed bearing ring or the fixed bearing ring segment, the rotatable bearing ring or the rotatable bearing ring segment forms an axial-radial pivot bearing, i.e. an upper suspension for the holder and/or supporting frame with only a rotational degree of freedom for the same. The position of the holder is determined by the pivot bearing radially and axially relative to the kingpin and thus the trailer plate. However, the supporting frame can tilt in the downward direction at its free end on the plug side due to its radial length and an unfavorable lever, especially when wear occurs. This can only be counteracted in part by stiffening the bearing structure and the supporting frame, especially since care should be taken to keep these components as light as possible. Therefore, the support element is provided which counteracts the inclination by forming a lower support for the holder and thus the supporting frame on the kingpin at an axial distance from the plane of the pivot bearing, which plane of the pivot bearing is defined by the plane of the axial sliding surfaces of the bearing rings/bearing ring segments resting on each other. Through this, as previously described, the vertical position of the plug relative to the kingpin and the trailer plate is defined. However, according to the invention, the support is not provided directly by an integral part of the supporting frame, but via the separate support element, which is adjustable in length in the radial direction and thus provides an adjustment option for the inclination of the holder and the supporting frame. This allows fine adjustment of the vertical position of the connector relative to the connector socket, by means of which, for example, manufacturing tolerances, wear or the like can be compensated for, so that coupling can be performed safely in the known manner.

It should be noted at this point that both fixed bearing rings and rotatable bearing rings with a 360° circumference can be used for the pivot bearing, as well as only "bearing ring segments" in each case or a combination of a bearing ring on the one hand and a "bearing ring segment" on the other. In principle, bearing ring segments are sufficient to ensure the degree of freedom of the rotational movement and to fix the position in all other dimensions, since the fifth wheel coupling only permits rotational movement over a pitch circle of a maximum of approx. 260° anyway. Completely annular fixed and rotatable bearing rings, however, have the advantage of higher rigidity, which in turn ensure more precise position definition, particularly in the event of tilting moments occurring, and are therefore regularly to be preferred.

The support element preferably has a sliding surface in contact with the king pin. Because the support element is a separate component, it can be optimized in a simple manner with regard to its function as a sliding element. This is particularly preferably done by forming the sliding surface by a surface of a friction-reduced material. In this sense, the sliding element can be made predominantly of the friction-reduced material, in which case it would be referred to as a solid material, or it can have a coating of such a material. A friction-reduced material refers to a material which contains tribologically effective fillers, so-called dry lubricants such as, for example, preferably graphite, PTFE, MoS2, h-BN, lead, tin or the like, and therefore has a low coefficient of friction in its interaction with the kingpin compared with the aluminum or steel material normally used for the supporting frame without fillers. Suitable matrix materials for such solid materials or coatings include plastic, bronze or aluminum.

Also preferably, therefore, the support element has a plastic matrix at least along the sliding surface, in particular made of thermoplastic, especially polyethylene (PE), polyimide (PA), polypropylene (PP), polyetheretherketone (PEEK), polyetherimide (PEI), polyoxymethylene (POM), acrylonitrile-butadiene-styrene (ABS).

The kingpin preferably has a cylindrical surface of radius r, or at least a segment thereof, arranged coaxially about the axis of rotation, against which the support element abuts. Again, it should be noted that, due to the limited angle of rotation of the fifth wheel, one cylinder segment is sufficient, but generally the king pin has one or, due to its obligatory necking, several circular cross-sections over its entire axial extent and in this sense has at least one cylindrical surface against which the support element can abut. Since the obligatory necking is provided for interlocking with the fifth wheel, the king pin can optionally abut either above it, on the so-called upper collar, or below it, on the so-called lower collar.

The sliding surface is preferably geometrically configured to center the support element relative to the kingpin in a direction perpendicular to the axis of rotation. This is advantageously realized either by the sliding surface forming a V-shaped contour in a plane perpendicular to the axis of rotation, or by the sliding surface being formed as a concavely curved surface with a radius r', the radius r' being between r−5 mm and r+5 mm, further preferably between r−1 mm and r+5 mm and particularly preferably between r and r+5 mm. In both cases, the position of the sliding surface is defined in the tangential direction with respect to the axis of rotation or the cylindrical surface of the kingpin.

The support element is preferably connected to the holder by means of a connecting element which is adjustable in length in the radial direction with respect to the axis of rotation. As part of the support element, the connecting element ensures its adjustability in the radial direction. In particular, the support element is preferably connected to the supporting frame by means of a threaded rod (as a connecting element) extending in the radial direction with respect to the axis of rotation. Alternative embodiments provide for pins or rods in conjunction with clamping pieces or clamping screws, rails with elongated holes and connecting screws, a toggle arrangement or toothed or latched elements such as a gear rack and corresponding counterparts engaging in the toothing instead of the threaded rod.

The holder preferably has a transverse strut against which the length-adjustable connecting element and/or the threaded rod abuts. The transverse strut extends in a plane perpendicular to the axis of rotation and substantially tangentially at a sufficient distance from the king pin to permit length adjustability of the support element.

The fixed bearing ring or fixed bearing ring segment is preferably attached directly to the kingpin flange. This allows the kingpin assembly to be easily replaced or retrofitted without having to make structural changes to the semitrailer itself. For example, an old kingpin can be unscrewed from the semitrailer plate and a new kingpin with the same hole pattern in the kingpin flange, including pivot bearing and holder, can be mounted in its place.

The fixed bearing ring or fixed bearing ring segment is preferably arranged radially on the inside with respect to the axis of rotation, and the rotatable bearing ring or rotatable bearing ring segment is arranged radially on the outside. This also contributes to easy interchangeability or retrofit-tability of the kingpin assembly with simultaneous optimum rotational guidance, as will be explained below with reference to the drawings.

In the case of a single-piece configuration, i.e. if the holder is configured as a supporting frame oriented radially outward with respect to the axis of rotation, a spacer projecting upward from the holder or supporting frame in the direction of the axis of rotation is arranged on the latter, which spacer is arranged to abut the holder or supporting frame indirectly or directly on the semitrailer.

In the case of a multi-part design, i.e. if a supporting frame is mounted on the holder oriented radially outwards with respect to the axis of rotation, a spacer piece projecting from the supporting frame in the direction of the axis of rotation is arranged on the latter, which is also arranged to abut the supporting frame indirectly or directly on the semitrailer.

In both cases, the length-adjustable support element is preferably adjusted so that the supporting frame or the holder abuts the semitrailer plate with the spacer, thereby reducing a tendency to vibrate of the holder or supporting frame and determining more precisely the position of the free end of the holder or supporting frame on which the connecting means is arranged. In order to avoid mechanical stresses when the holder is rotated about the king pin, the support element is advantageously aligned according to the lowest point of the area of the trailer plate that can be swept over by the holder during rotation.

The rotatable bearing ring or bearing ring segment advantageously has a cylinder wall segment extending in the direction of the axis of rotation, to which the holder is fixed. The cylinder wall segment forms the vertical connection from the plane of the axial rotary bearing to the holder and is at the same time suitable for forming the transverse strut for abutting the length-adjustable connecting element and/or the threaded rod.

The cylinder wall segment preferably has a width in the tangential direction of <2.1×r and thus participates in guiding the connecting means during coupling as the radially innermost part of the v-shaped support element in the case of a one-piece design or as the inner continuation of the holder in the case of a two-piece design.

In a preferred embodiment, the support element is designed to be elastically deformable at least in the radial direction with respect to the axis of rotation and/or has a spring element acting in this direction, so that the support element abuts the kingpin under an adjustable pretension. The spring element can, for example, be a spiral compression spring, a disc spring assembly or an elastically deformable plastic body. This design, in conjunction with the length adjustment of the support element, makes it possible to adjust a specific pretension which always ensures that the support element abuts the king pin and the supporting frame abuts the trailer plate with constant contact pressure. This reduces any distortion of the supporting frame and at the same time allows vibrations of the supporting frame to be damped even better.

BRIEF DESCRIPTION OF THE DRAWINGS

These and other features and advantages of the invention are explained in more detail below with reference to figures. They show.

DETAILED DESCRIPTION OF THE INVENTION

Figure 1:
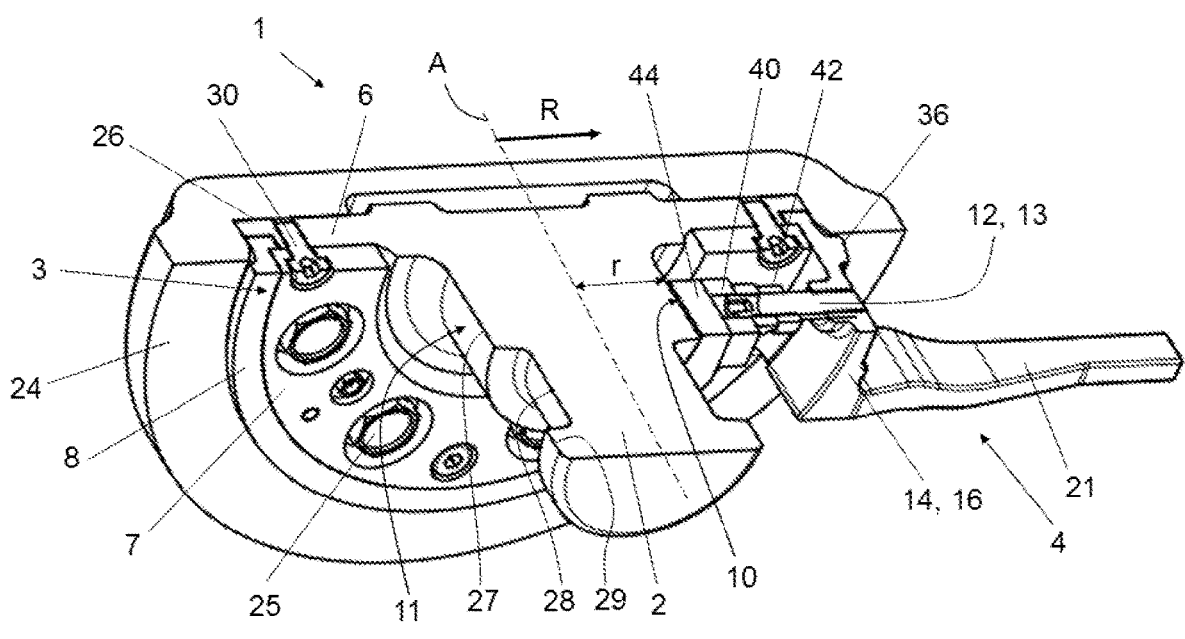
FIG. 1 a perspective sectional view of an embodiment of the kingpin assembly according to the invention.
Figure 2:
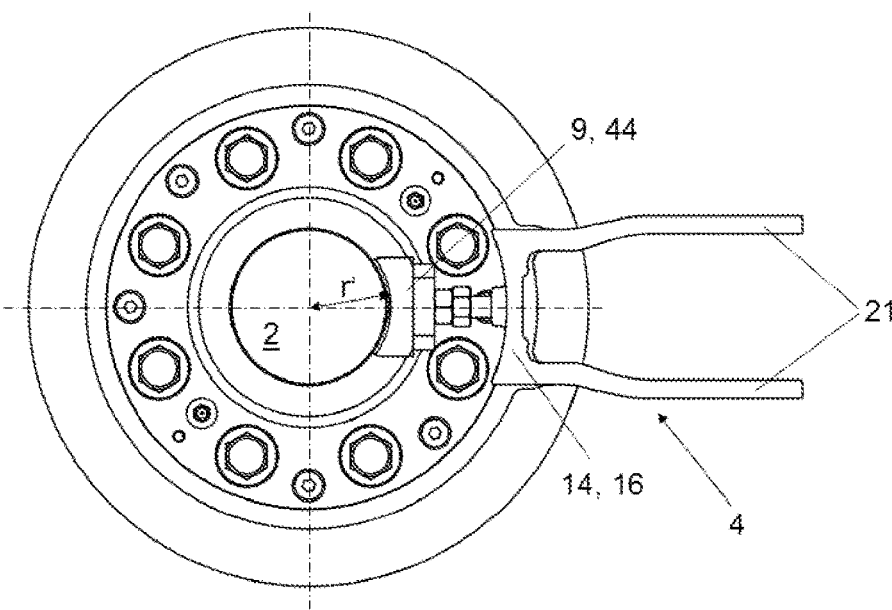
FIG. 2 the kingpin assembly from below.

FIGS. 1 to 5 show the same kingpin assembly 1 for a semitrailer of a road train, comprising a king pin 2 defining an axis of rotation A, a pivot bearing 3 arranged about the axis of rotation A, and a holder 4 connected to the pivot bearing 3 and pivotable about the axis of rotation A. In this multi-part embodiment, the holder 4 is designed as a mounting base for a supporting frame 20 and comprises a cylinder wall segment 16 and two fork-shaped holding arms 21 projecting substantially radially from a cylinder wall segment 16.

Figure 3:
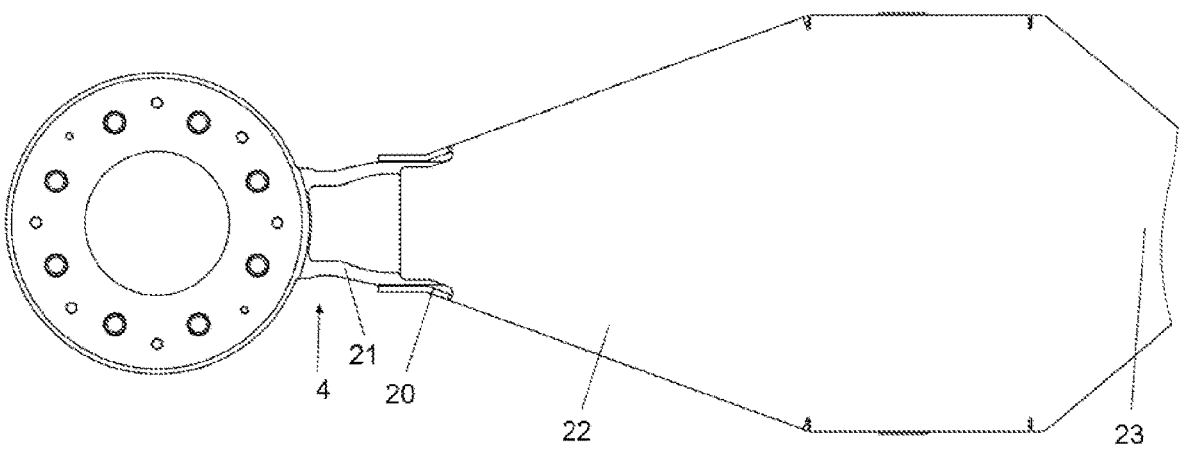
FIG. 3 the kingpin assembly from below with supporting frame.
Figure 4:
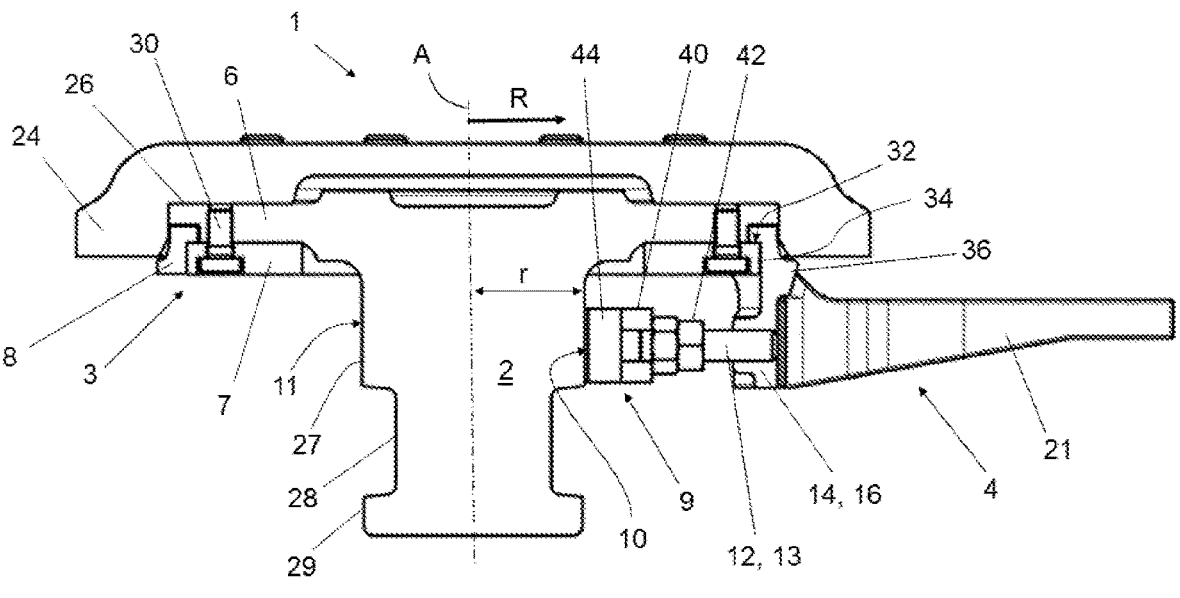
FIG. 4 the kingpin assembly in section in the side view
Figure 5:
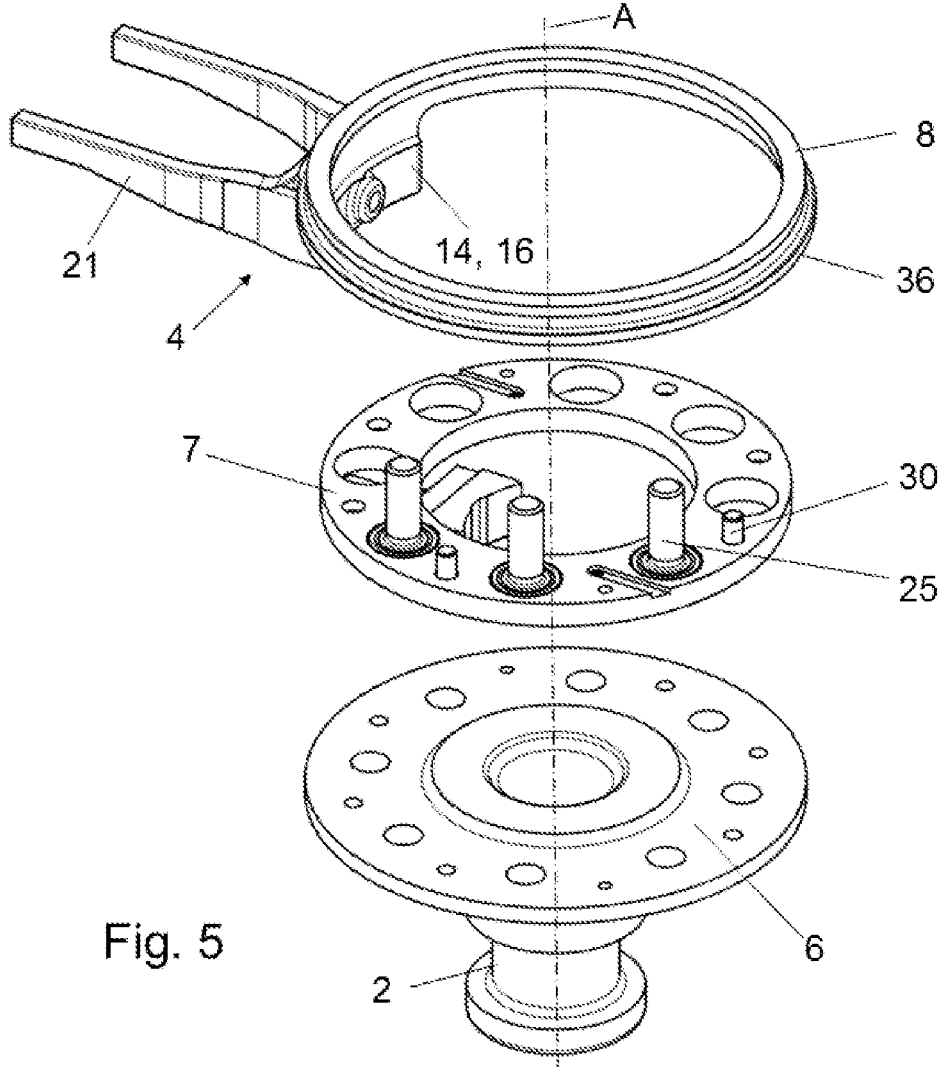
FIG. 5 is an exploded view of the kingpin assembly.

The supporting frame 20 is fixed to the two holding arms 21 of the holder 4, as shown in FIG. 3. This is therefore a multi-part design in which the holder 4 is configured as a mounting base for the supporting frame 20. On the upper side, the supporting frame 20 comprises a protective cover 22. Below the protective cover 22, a connecting means (not shown) is located inside the supporting frame 20 at its free end 23 and indirectly attached to it via a base plate. The supporting frame 20 is formed in sections as a V-shaped frame structure, the sides of which are adapted to the angle of the entry opening corresponding thereto.

The king pin 2 comprises a kingpin flange 6 for mounting the king pin 2 to the semitrailer, and here more specifically to a plate 18 welded to the semitrailer plate 24. The mounting is carried out, as known in the prior art, by means of bolts 25 arranged in a circle along the flange 6. The plate 18 comprises a recess 26 towards the top, in which the kingpin flange 6 and, in parts, the pivot bearing 3 are received. The depth of the recess 26 plus the thickness of the trailer plate 24 are such that the pivot bearing 3, with the exception of the integrally formed cylinder wall segment 16 of the holder 4, does not project beyond the underside of the trailer plate 24.

The king pin further comprises, as generally known in the art, as viewed from the top to the bottom, an upper collar 27, a necking 28 and a lower collar 29. The upper collar 27, the necking 28 and the lower collar 29 all have a basic circular cylindrical shape. At the upper collar, the kingpin has a radius r. The necking 28 is the section at which the locking device of the fifth wheel engages.

The pivot bearing 3 comprises a fixed bearing ring 7, relative to the king pin 2, and a rotatable bearing ring 8, relative thereto. The fixed bearing ring 7 is attached directly to the king pin flange by means of screws 30.

The double bolting of the flange 6 and the fixed bearing ring 7 means that the kingpin assembly 1 as a whole, or only parts of the pivot bearing 3, can be replaced in a simple manner. No structural changes need to be made to the semitrailer, particularly in the case of retrofitting, because the kingpin assembly 1 according to the invention can simply be mounted in place of an old one. This is ensured not only by the identical screw connection, but also by the small installation space required for the pivot bearing 3 together with the holder 4. For this purpose, it is again advantageous if, as can be seen in particular in FIGS. 1 and 4, the fixed bearing ring 7 is arranged radially on the inside with respect to the axis of rotation A and the rotatable bearing ring 8 is arranged radially on the outside.

Together with the fixed bearing ring 7, the rotatable bearing ring 8 forms an axial-radial pivot bearing. In the axial direction, the bearing arrangement is achieved by the axial sliding surfaces of the bearing rings 7 and 8 resting on each other. The sliding surfaces define the "plane of rotation" or "plane of the pivot bearing" 32, see FIG. 4. In the radial direction, the bearing rings abut each other along circular cylindrical surfaces 34, thus limiting the degree of freedom of movement of the holder 4 to a purely rotational movement. Along its outer peripheral surface, the rotatable bearing ring 8 comprises a circumferentially stepped stiffening rim 36.

The holder 4 is fixed to the rotatable bearing ring 8. In the embodiment shown, it is integrally formed with its cylinder wall segment 16 on the latter. The cylinder wall segment thus forms the vertical connection from the plane 32 of the axial rotary bearing to the holder 4.

The position of the holder 4 is thus determined by the pivot bearing 3 radially and axially relative to the king pin 2 and trailer plate 24.

To ensure that the support frame 20 does not tilt downwards, or only as little as possible, due to its radial overall length, the kingpin arrangement 1 comprises a support element 9. This is connected to the holder 4 by means of a connecting element 12 which is adjustable in length in the radial direction R with respect to the axis of rotation A. It is arranged axially spaced below the plane 32 of the pivot bearing 3 and there abuts directly against a cylindrical surface 11 of the upper collar 27 of the king pin 2 arranged coaxially about the axis of rotation A. While the necking 28 must remain fully free for locking with the fifth wheel coupling, in an alternative embodiment the support element 9 can also abut against the lower collar 29, resulting in an overall greater lever and thus a firmer support.

In this example, the connecting element 12 is designed as a threaded rod 13, which is screwed into the cylinder wall segment 16, which here forms the transverse strut 14, on the radially inner side and in this way is supported against it. Alternatively, it can also be fixed to it, for example, by a material-locking or friction-locking connection. On the other side, the threaded rod 12 is screwed into a metal block 40 of the support element 9 and locked with a nut 42. As part of the support element 9, the threaded rod 12 ensures its adjustability in the radial direction R. If the support element is extended in the radial direction by screwing out the threaded rod, for example, the holder 4 is raised at its free end and, conversely, lowered by screwing in. The holder can thus be adapted precisely, for example, to the degree of wear of the king pin, structural tolerances of the supporting frame, plug or trailer plate, so that the plug can be brought vertically exactly into its desired position.

The support element 9 further comprises a sliding surface 10 in direct contact with the cylindrical surface 11 of the king pin 2, the sliding surface 10 being formed on a plastic block 44 which in turn is bonded or otherwise attached to the metal block 40 of the support element 9. The plastic block 44 has a plastic matrix in which tribologically effective filler particles may be dispersed to reduce the coefficient of friction in cooperation with the surface of the king pin 2.

The sliding surface 10 is formed as a concavely curved surface with a radius r', whereby the support element 9 aligns itself relative to the kingpin in a tangential direction with respect to the axis of rotation A or the cylindrical surface 11 of the king pin 2.

Figure 6:
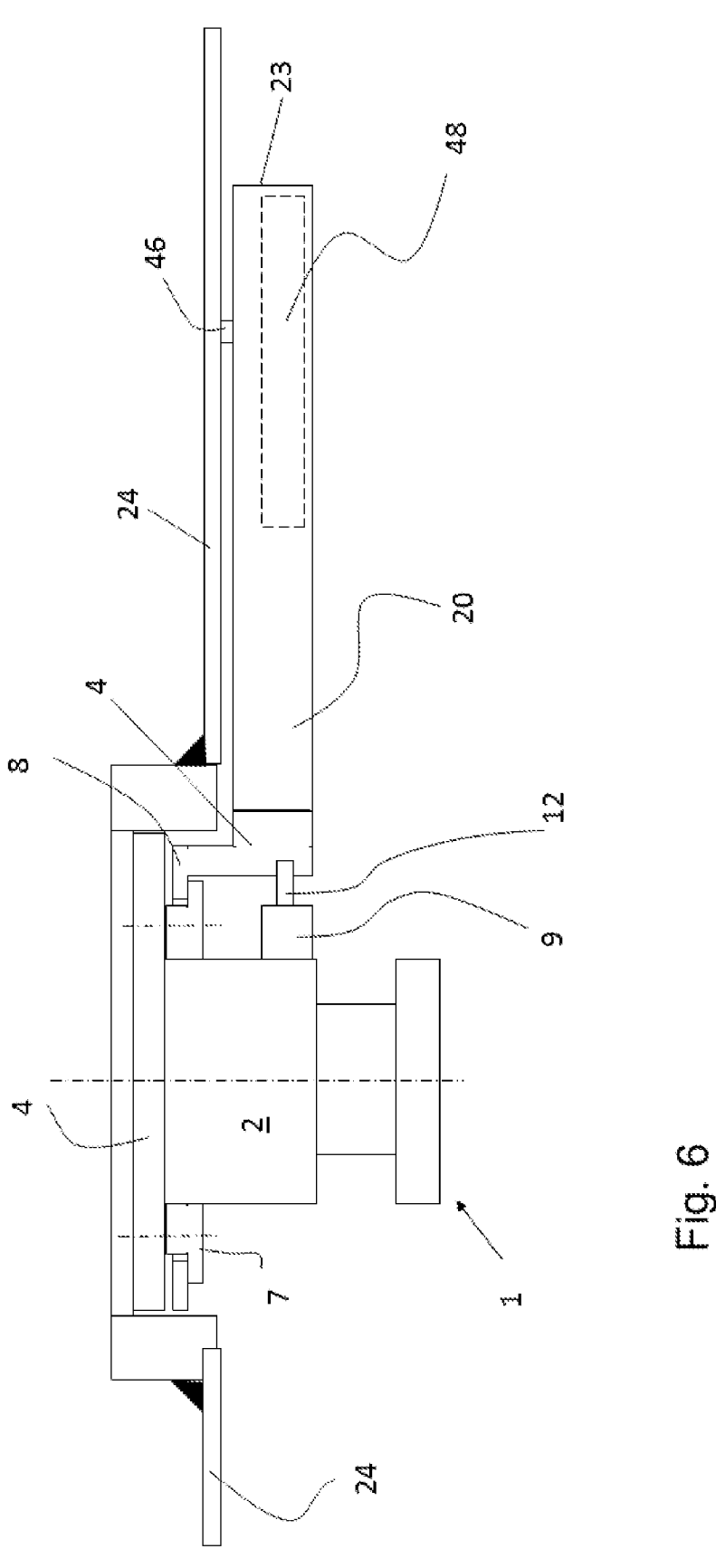
FIG. 6 a schematic representation of an embodiment of the kingpin assembly according to the invention in side view.

FIG. 6 schematically shows a kingpin assembly according to the invention with a radially outwardly oriented supporting frame 20, on which a spacer 46 is arranged projecting upwardly from the supporting frame 20 in the direction of the axis of rotation A, which spacer 46 abuts the supporting frame 20 against the semitrailer plate 24 of the semitrailer.

Within the supporting frame 20, attached to its free end 23, is a connecting means 48, shown in dashed lines.

In this embodiment, the support element 9 comprises a spring element 50 acting with respect to the axis of rotation A in the radial direction R. The spring element 50 is shown schematically and can, for example, be a spiral compression spring, a disc spring assembly or an elastically deformable plastic body. In conjunction with the length adjustment of the support element 9, it allows a specific pretension to be adjusted which always ensures that the support element 9 abuts against the king pin 2 and the supporting frame 20 abuts against the trailer plate 24 via the spacer 46 with a constant contact pressure.

LIST OF REFERENCE SIGNS 1 kingpin assembly
2 king pin
3 pivot bearing
4 holder
6 kingpin flange
7 fixed bearing ring
8 rotatable bearing ring
9 support element
10 sliding surface
11 cylindrical surface
12 connecting element
13 threaded rod
14 transverse strut
16 cylinder wall segment
18 plate
20 support frame
21 support arm
22 protective cover
23 free end (of the support frame)
24 trailer plate
25 screw
26 recess
27 upper collar
28 necking
29 lower collar
30 screw
32 plane of rotation/plane of pivot bearing
34 circular cylindrical surface
36 rim
40 metal block
42 nut
44 plastic block
46 spacer
48 connecting means
50 spring element

What is claimed is:

1. A kingpin assembly for a semitrailer of a road train, comprising:
   a kingpin defining an axis of rotation (A),
   a pivot bearing arranged around the axis of rotation (A), and a holder connected to the pivot bearing and pivotable about the axis of rotation (A) for indirectly or directly holding a connecting means wherein the kingpin comprises a kingpin flange for mounting the kingpin indirectly or directly to the semitrailer, wherein the pivot bearing comprises a bearing ring fixed relative to the kingpin or a bearing ring segment fixed relative to the kingpin and a bearing ring rotatable relative to the kingpin or a bearing ring segment rotatable relative to the kingpin wherein the holder is fixed to the rotatable bearing ring or rotatable bearing ring segment and wherein a support element is connected to the holder, wherein the support element is axially spaced from the rotatable bearing ring or the rotatable bearing ring segment, and wherein the support element abuts directly against the kingpin and is adjustable in length in a radial direction (R) with respect to the axis of rotation (A).

2. The kingpin assembly according to claim 1, wherein the support element has a sliding surface in contact with the kingpin.

3. The kingpin assembly according to claim 2, wherein the sliding surface is formed by a surface of a friction-reduced material.

4. The kingpin assembly according to claim 2, wherein the kingpin has a cylindrical surface arranged coaxially about the axis of rotation (A) and having a radius r, or at least a segment thereof, against which the support element abuts.

5. The kingpin assembly according to claim 4, wherein the sliding surface is geometrically configured to center the support element relative to the kingpin in a direction perpendicular to the axis of rotation.

6. The kingpin assembly according to claim 4, wherein the sliding surface forms a V-shaped contour in a plane perpendicular to the axis of rotation (A).

7. The kingpin assembly according to claim 4, wherein the sliding surface is formed as a concavely curved surface with radius r', the radius r' being between r−5 mm and r+5 mm.

8. The kingpin assembly according to claim 1, wherein the support element has, at least along the sliding surface, a plastic matrix.

9. The kingpin assembly according to claim 8, wherein the plastic matrix comprises polyethylene (PE), polyamide (PA), polypropylene (PP), polyetheretherketone (PEEK), polyetherimide (PEI), polyoxymethylene (POM) or acrylonitrile-butadiene-styrene (ABS).

10. The kingpin assembly according to claim 1, wherein the support element is connected to the holder by a connecting element which is adjustable in length in the radial direction (R) with respect to the axis of rotation (A).

11. The kingpin assembly according to claim 10, wherein the holder has a transverse strut to which the length-adjustable connecting element and/or a threaded rod are supported.

12. The kingpin assembly according to claim 1, wherein the support element is connected to the holder by a threaded rod extending in the radial direction (R) with respect to the axis of rotation (A).

13. The kingpin assembly according to claim 1, wherein the fixed bearing ring or the fixed bearing ring segment is attached directly to the kingpin flange.

14. The kingpin assembly according to claim 1, wherein the fixed bearing ring or the fixed bearing ring segment is arranged radially inwardly with respect to the axis of rotation (A) and the rotatable bearing ring or the rotatable bearing ring segment is arranged radially outwardly.

15. The kingpin assembly according to claim 1, wherein a support frame is mounted on the holder radially outwardly with respect to the axis of rotation (A), and wherein a spacer is arranged on the support frame, the spacer is arranged projecting in the direction of the axis of rotation (A) and being arranged to support the support frame indirectly or directly on the semitrailer.

16. The kingpin assembly according to claim 1, wherein the holder is configured as a supporting frame which is oriented radially outwardly with respect to the axis of rotation (A) and on which is arranged a spacer which projects in the direction of the axis of rotation (A) and is arranged to support the holder indirectly or directly on the semitrailer.

17. The kingpin assembly according to claim 1, wherein the rotatable bearing ring or the rotatable bearing ring segment has a cylinder wall segment extending in the direction of the axis of rotation (A), to which the holder is fixed.

18. The kingpin assembly according to claim 17, wherein the cylinder wall segment has a width in a tangential direction of <2.1×r.

19. The kingpin assembly according to claim 1, wherein the support element is designed to be elastically deformable at least in the radial direction (R) with respect to the axis of rotation (A) and/or has a spring element acting in the radial direction, so that the support element abuts against the kingpin under an adjustable pretension.

20. The kingpin assembly according to claim 1, wherein the connecting means is at least one of an electrical, electromagnetic, pneumatic and hydraulic connecting means.

* * * * *